(12) United States Patent
Andreev et al.

(10) Patent No.: US 7,898,538 B2
(45) Date of Patent: Mar. 1, 2011

(54) METHOD AND SYSTEM FOR ESTIMATING SCREEN REFRESH RATES OF COMPUTING UNITS PARTICIPATING IN AN INTERNET-BASED COLLABORATION

(75) Inventors: Dmitry Andreev, Port Chester, NY (US); Thomas Michael Dauffenbach, Prior Lake, MN (US); Galina Grunin, Briarcliff Manor, NY (US); Gregory Vilshansky, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 1065 days.

(21) Appl. No.: 11/669,379

(22) Filed: Jan. 31, 2007

(65) Prior Publication Data

US 2008/0180449 A1    Jul. 31, 2008

(51) Int. Cl.
  *G09G 5/00* (2006.01)
(52) U.S. Cl. ........................ 345/213; 345/501
(58) Field of Classification Search ............... 345/213, 345/501
See application file for complete search history.

(56) References Cited

U.S. PATENT DOCUMENTS

| | | | |
|---|---|---|---|
| 6,505,239 B1 | 1/2003 | Kobata et al. | |
| 2002/0194095 A1 | 12/2002 | Koren | |
| 2004/0249980 A1 | 12/2004 | Hutler et al. | |

OTHER PUBLICATIONS

Stodle, et al.; Collabortive Sharing of Windows between macOS X, the X Window System and Windows*; 12 pages.

*Primary Examiner* — Kevin M Nguyen
*Assistant Examiner* — Kenneth B Lee, Jr.
(74) *Attorney, Agent, or Firm* — Schmeiser, Olsen & Watts; William E. Schiesser

(57) ABSTRACT

A method and system for estimating a screen refresh rate of a computing unit participating in an Internet-based collaboration. The computing unit receives a test image that includes pixels located at predefined positions and blinking at predefined frequencies. Measurements of the number of blinks of the pixels in a specified time period are collected. An average of the measurements summed over the predefined frequencies is calculated. A screen refresh rate is estimated by comparing the calculated average to a sum of multiple sums of simulated blinks of pixels in the specified time period. The average is closer to the sum than any of the other sums and the sum is associated with the estimated screen refresh rate.

28 Claims, 9 Drawing Sheets

_300_

| Test frequency | Number of blinks of test pixel 1 | Number of blinks of test pixel 2 | Number of blinks of test pixel 3 | Number of blinks of test pixel 4 | Average sum of number of blinks over all the test pixels |
|---|---|---|---|---|---|
| 1 | 1 | 1 | 1 | 1 | |
| 2 | 2 | 2 | 2 | 2 | |
| 3 | 3 | 3 | 3 | 3 | |
| 4 | 4 | 4 | 4 | 4 | |
| 5 | 5 | 5 | 5 | 5 | |
| 6 | 6 | 6 | 6 | 6 | |
| 7 | 5 | 5 | 5 | 5 | |
| 8 | 4 | 4 | 4 | 4 | |
| 9 | 3 | 3 | 3 | 3 | |
| 10 | 2 | 2 | 2 | 2 | |
| 11 | 1 | 1 | 1 | 1 | |
| 12 | 0 | 0 | 0 | 0 | |
| 13 | 1 | 1 | 1 | 1 | |
| 14 | 2 | 2 | 2 | 2 | |
| 15 | 3 | 3 | 3 | 3 | |
| 16 | 4 | 4 | 4 | 4 | |
| 17 | 5 | 5 | 5 | 5 | |
| 18 | 6 | 6 | 6 | 6 | |
| 19 | 5 | 5 | 5 | 5 | |
| 20 | 4 | 4 | 4 | 4 | |
| 21 | 3 | 3 | 3 | 3 | |
| 22 | 2 | 2 | 2 | 2 | |
| 23 | 1 | 1 | 0 | 1 | |
| 24 | 0 | 0 | 0 | 0 | |
| 25 | 1 | 0 | 0 | 0 | |
| Sum of number of blinks over all the test frequencies | 73 | 72 | 71 | 72 | 72 |

*300*

| Test frequency | Number of blinks of test pixel 1 | Number of blinks of test pixel 2 | Number of blinks of test pixel 3 | Number of blinks of test pixel 4 | Average sum of number of blinks over all the test pixels |
|---|---|---|---|---|---|
| 1 | 1 | 1 | 1 | 1 | |
| 2 | 2 | 2 | 2 | 2 | |
| 3 | 3 | 3 | 3 | 3 | |
| 4 | 4 | 4 | 4 | 4 | |
| 5 | 5 | 5 | 5 | 5 | |
| 6 | 6 | 6 | 6 | 6 | |
| 7 | 5 | 5 | 5 | 5 | |
| 8 | 4 | 4 | 4 | 4 | |
| 9 | 3 | 3 | 3 | 3 | |
| 10 | 2 | 2 | 2 | 2 | |
| 11 | 1 | 1 | 1 | 1 | |
| 12 | 0 | 0 | 0 | 0 | |
| 13 | 1 | 1 | 1 | 1 | |
| 14 | 2 | 2 | 2 | 2 | |
| 15 | 3 | 3 | 3 | 3 | |
| 16 | 4 | 4 | 4 | 4 | |
| 17 | 5 | 5 | 5 | 5 | |
| 18 | 6 | 6 | 6 | 6 | |
| 19 | 5 | 5 | 5 | 5 | |
| 20 | 4 | 4 | 4 | 4 | |
| 21 | 3 | 3 | 3 | 3 | |
| 22 | 2 | 2 | 2 | 2 | |
| 23 | 1 | 1 | 0 | 1 | |
| 24 | 0 | 0 | 0 | 0 | |
| 25 | 1 | 0 | 0 | 0 | |
| Sum of number of blinks over all the test frequencies | 73 | 72 | 71 | 72 | 72 |

*FIG. 3*

| Test pixel frequency | Participant computing unit screen refresh frequency ||||||||||||||||||||||||||
|---|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
| 1 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 2 | 0 | 0 | 1 | 2 | 2 | 2 | 2 | 2 | 2 | 2 | 2 | 2 | 2 | 2 | 2 | 2 | 2 | 2 | 2 | 2 | 2 | 2 | 2 | 2 | 2 |
| 3 | 0 | 1 | 0 | 1 | 2 | 3 | 3 | 3 | 3 | 3 | 3 | 3 | 3 | 3 | 3 | 3 | 3 | 3 | 3 | 3 | 3 | 3 | 3 | 3 | 3 |
| 4 | 0 | 0 | 1 | 0 | 1 | 2 | 3 | 4 | 4 | 4 | 4 | 4 | 4 | 4 | 4 | 4 | 4 | 4 | 4 | 4 | 4 | 4 | 4 | 4 | 4 |
| 5 | 0 | 1 | 1 | 1 | 0 | 1 | 2 | 3 | 4 | 5 | 5 | 5 | 5 | 5 | 5 | 5 | 5 | 5 | 5 | 5 | 5 | 5 | 5 | 5 | 5 |
| 6 | 0 | 0 | 0 | 1 | 1 | 0 | 1 | 2 | 3 | 4 | 5 | 6 | 6 | 6 | 6 | 6 | 6 | 6 | 6 | 6 | 6 | 6 | 6 | 6 | 6 |
| 7 | 0 | 1 | 1 | 1 | 1 | 1 | 0 | 1 | 2 | 3 | 4 | 5 | 6 | 7 | 7 | 7 | 7 | 7 | 7 | 7 | 7 | 7 | 7 | 7 | 7 |
| 8 | 0 | 0 | 1 | 0 | 2 | 2 | 1 | 0 | 1 | 2 | 3 | 4 | 5 | 6 | 7 | 8 | 8 | 8 | 8 | 8 | 8 | 8 | 8 | 8 | 8 |
| 9 | 0 | 1 | 1 | 1 | 1 | 2 | 2 | 1 | 0 | 1 | 2 | 3 | 4 | 5 | 6 | 7 | 8 | 9 | 9 | 9 | 9 | 9 | 9 | 9 | 9 |
| 10 | 0 | 0 | 1 | 2 | 0 | 2 | 3 | 2 | 1 | 0 | 1 | 2 | 3 | 4 | 5 | 6 | 7 | 8 | 9 | 10 | 10 | 10 | 10 | 10 | 10 |
| 11 | 0 | 1 | 1 | 0 | 1 | 1 | 3 | 3 | 2 | 1 | 0 | 1 | 2 | 3 | 4 | 5 | 6 | 7 | 8 | 9 | 10 | 11 | 11 | 11 | 11 |
| 12 | 0 | 0 | 0 | 1 | 2 | 0 | 2 | 4 | 3 | 2 | 1 | 0 | 1 | 2 | 3 | 4 | 5 | 6 | 7 | 8 | 9 | 10 | 11 | 12 | 12 |
| 13 | 0 | 1 | 1 | 2 | 1 | 1 | 1 | 3 | 4 | 3 | 2 | 1 | 0 | 1 | 2 | 3 | 4 | 5 | 6 | 7 | 8 | 9 | 10 | 11 | 12 |
| 14 | 0 | 0 | 1 | 1 | 0 | 2 | 0 | 2 | 4 | 4 | 3 | 2 | 1 | 0 | 1 | 2 | 3 | 4 | 5 | 6 | 7 | 8 | 9 | 10 | 11 |
| 15 | 0 | 1 | 0 | 0 | 1 | 3 | 1 | 1 | 3 | 5 | 4 | 3 | 2 | 1 | 0 | 1 | 2 | 3 | 4 | 5 | 6 | 7 | 8 | 9 | 10 |
| 23 | 0 | 0 | 0 | 0 | 1 | 0 | 2 | 1 | 4 | 5 | 2 | 0 | 2 | 4 | 7 | 7 | 7 | 6 | 5 | 3 | 2 | 1 | 1 | 0 | 1 |
| 24 | 0 | 0 | 0 | 0 | 1 | 0 | 3 | 0 | 3 | 4 | 2 | 0 | 1 | 3 | 6 | 8 | 7 | 6 | 6 | 4 | 3 | 2 | 1 | 0 | 0 |
| 25 | 0 | 1 | 1 | 1 | 0 | 1 | 3 | 1 | 2 | 5 | 3 | 1 | 1 | 3 | 5 | 7 | 8 | 7 | 6 | 5 | 4 | 3 | 2 | 1 | 0 |
| Sum of number of blinks over all the test frequencies | 0 | 13 | 17 | 25 | 30 | 37 | 45 | 49 | 59 | 65 | 66 | 73 | 84 | 95 | 102 | 107 | 108 | 109 | 111 | 115 | 120 | 127 | 135 | 145 | 156 |

METHOD AND SYSTEM FOR ESTIMATING SCREEN REFRESH RATES OF COMPUTING UNITS PARTICIPATING IN AN INTERNET-BASED COLLABORATION

FIELD OF THE INVENTION

The present invention relates to a method and system for estimating screen refresh rates of computing units that participating in an Internet-based collaboration.

BACKGROUND OF THE INVENTION

The screen image quality of an Internet-based collaboration application (e.g., web conferencing application), is significantly affected by the screen refresh rate, which, in turn, varies dramatically due to fluctuations introduced by the communication channels, as well as characteristics and parameters of (1) communication algorithms relative to transport and application layers, (2) image compression algorithms, and (3) screen refreshing algorithms. Conventional techniques determine parameter values for the three types of algorithms listed above by utilizing human experts who estimate the screen image quality (e.g., by assigning a ranking on a scale of 1 to 10). These conventional schemes are expensive, have insufficient reliability and consistency, and cannot be used in a fully automated mode. Thus, there exists a need to overcome at least one of the preceding deficiencies and limitations of the related art.

SUMMARY OF THE INVENTION

The present invention provides a method of estimating a screen refresh rate of a computing unit participating in an Internet-based collaboration, comprising:

receiving, by the computing unit and during the Internet-based collaboration, a test image including a plurality of test pixels located at predefined positions in the test image, wherein a test pixel of the plurality of test pixels performs a blinking between an on state and an off state at a predefined frequency of a plurality of predefined frequencies;

collecting, by the computing unit, a plurality of measurements, wherein a measurement of the plurality of measurements is a number of blinks in the blinking in a specified time period;

calculating, by the computing unit, an average of a first plurality of sums of multiple sets of measurements of the plurality of measurements over the plurality of predefined frequencies;

automatically selecting a screen refresh rate of a plurality of screen refresh rates as an estimated screen refresh rate of the computing unit, the automatically selecting including comparing the average to a sum of a second plurality of sums of sets of numbers of simulated blinks of a simulated test pixel in the specified time period, the average being closer to the sum than any other sum of the second plurality of sums, and the sum of the second plurality of sums being associated with the screen refresh rate.

A system, computer program product, and process for supporting computing infrastructure corresponding to the above-summarized method are also described and claimed herein.

Advantageously, the present invention provides a fully automated, reliable and consistent technique for estimating screen refresh rates of participant computing units collaborating via an Internet-based collaboration application.

BRIEF DESCRIPTION OF THE DRAWINGS

FIG. 3 is a table of sample measurement data obtained at a participant computing unit including test pixel blink data that is utilized in the process of FIG. 2, in accordance with embodiments of the present invention.

FIG. 4 is a table of simulated test pixel blink data that is compared to the measurement data of FIG. 3, in accordance with embodiments of the present invention.

DETAILED DESCRIPTION OF THE INVENTION

The present invention provides a technique for estimating a screen refresh rate of a computing unit participating in an Internet-based collaboration that includes a leader computing unit and one or more participant computing units. The leader computing unit sends blinking test pixels to the participating computing units and each participating computing unit collects measurement data including the number of blinks in a specified time period for each test pixel. The measurement data is compared to simulation data to determine an estimated screen refresh rate of each participant computing unit. The estimated screen refresh rate is used to (a) determine optimal parameter values for communication, image compression and screen refreshing algorithms; (b) compare different transport or application layer protocols being used by an Internet-based collaboration application; and (c) provide a web conference leader with automated feedback in real time (i.e., during the web conference), so the leader can assess and adjust the pace of the conference's presentation to improve the conference participants' viewing experience.

System for Estimating Screen Refresh Rates

Figure 1:
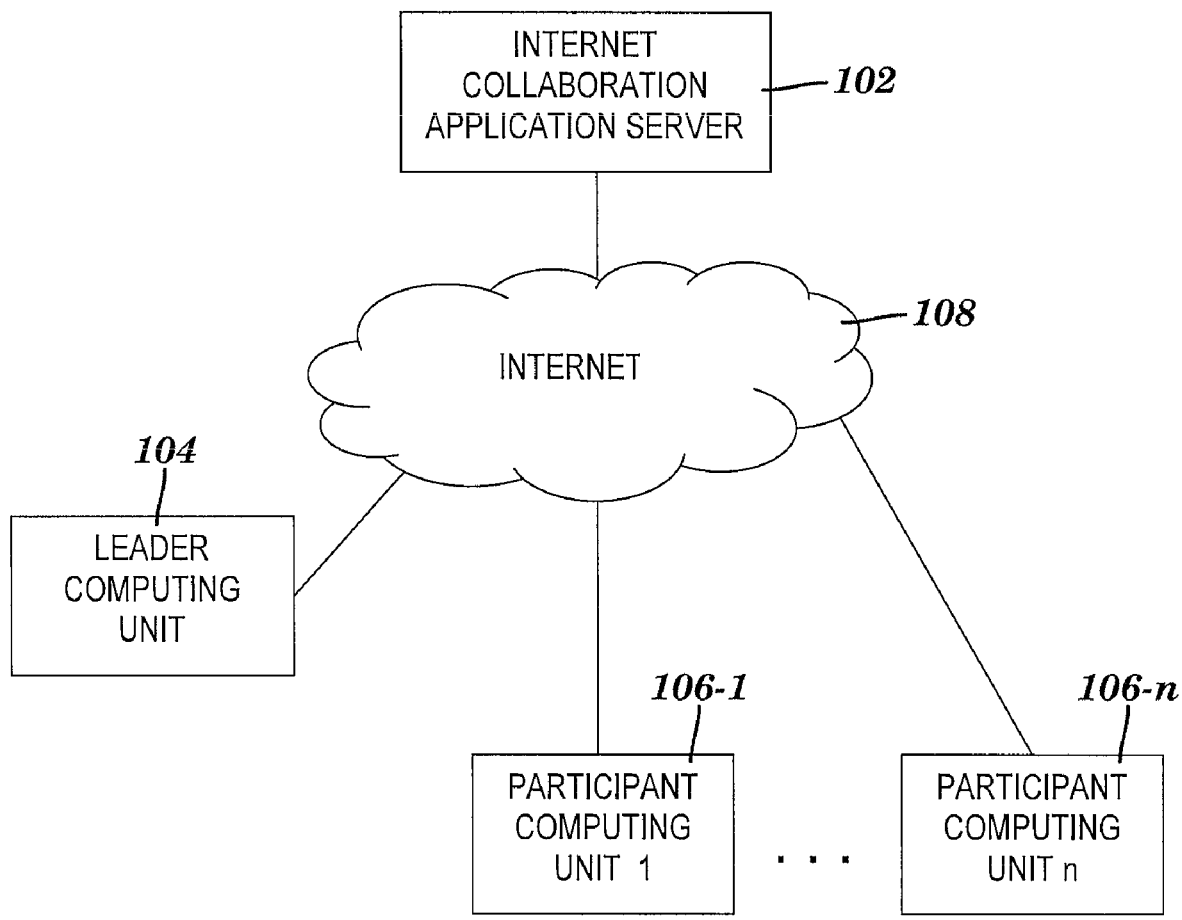
FIG. 1 is a block diagram of a system for estimating screen refresh rates of computing units participating in an Internet-based collaboration, in accordance with embodiments of the present invention.

FIG. 1 is a block diagram of a system for estimating screen refresh rates of computing units participating in an Internet-based collaboration (e.g., web conference), in accordance with embodiments of the present invention. System 100 includes an Internet collaboration application (e.g., web conferencing) server 102 in communication with a leader computing unit 104 (i.e., a computing unit utilized by a leader of an Internet-based collaboration, such as a web conference leader) and one or more participant computing units 106-1, . . . , 106-n (i.e., participant computing units 1, . . . , n utilized by non-leader participants of an Internet-based collaboration). Internet collaboration application server 102 connects to the Internet 108 over a communication channel with well-known characteristics (e.g., high performance broadband connection), in order to exclude the interference caused by the communication channel.

Leader computing unit 104 connects to Internet collaboration application server 102 over the Internet 108 using a communication channel with well-known characteristics (e.g., T1 link at 1500 Mbps), in order to exclude the interference caused by the communication channel.

The one or more participant computing units 106-1, ..., 106-n connect to the same Internet collaboration session via the Internet 108 as leader computing unit 104.

Screen Refresh Rate Estimation Process

Figure 2:
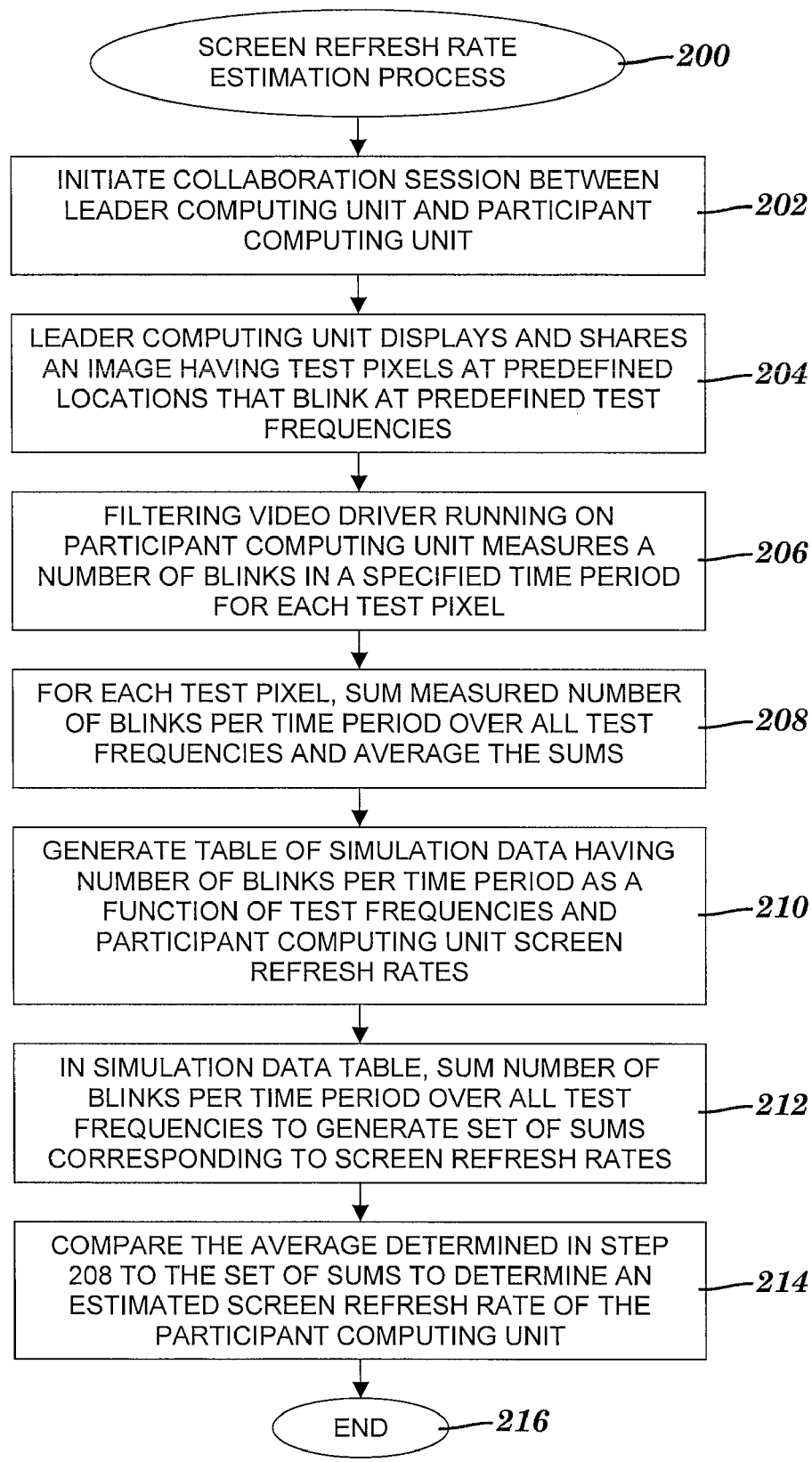
FIG. 2 is a flow diagram of a process of estimating screen refresh rates in the system of FIG. 1, in accordance with embodiments of the present invention.
Figure 5A:
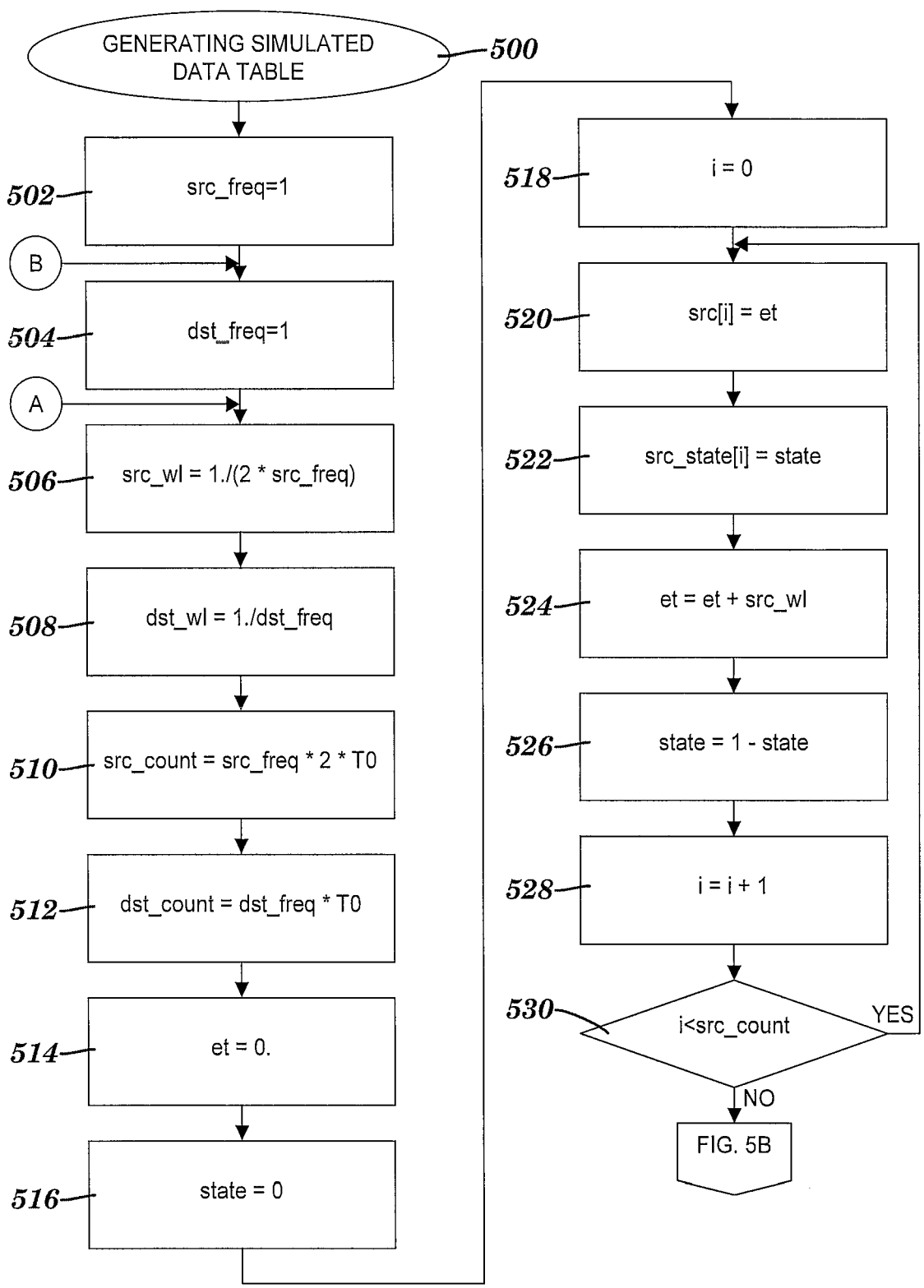
FIGS. 5A-5D depict a flow diagram of a process for generating the table of FIG. 4, in accordance with embodiments of the present invention.
Figure 5B:
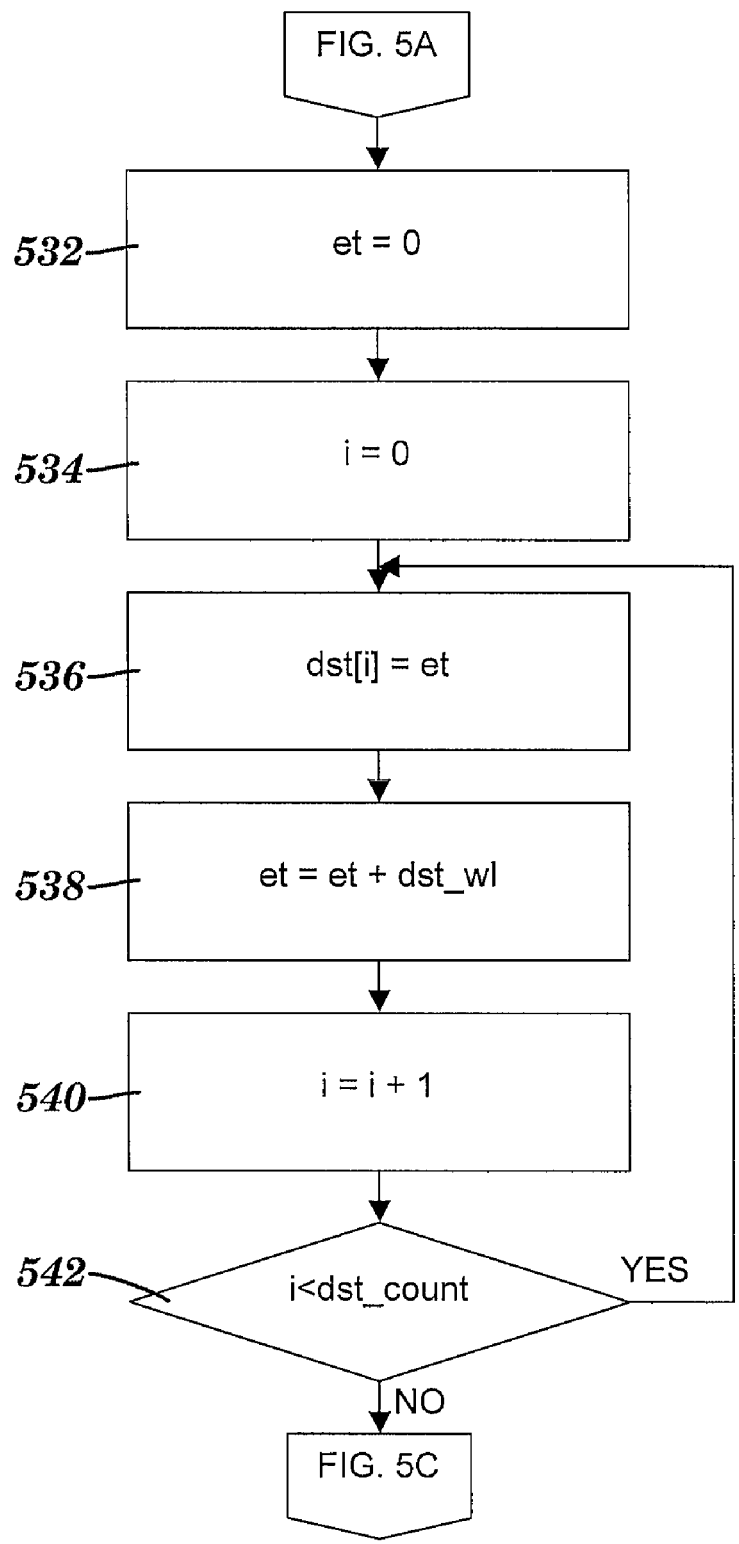
Figure 5C:
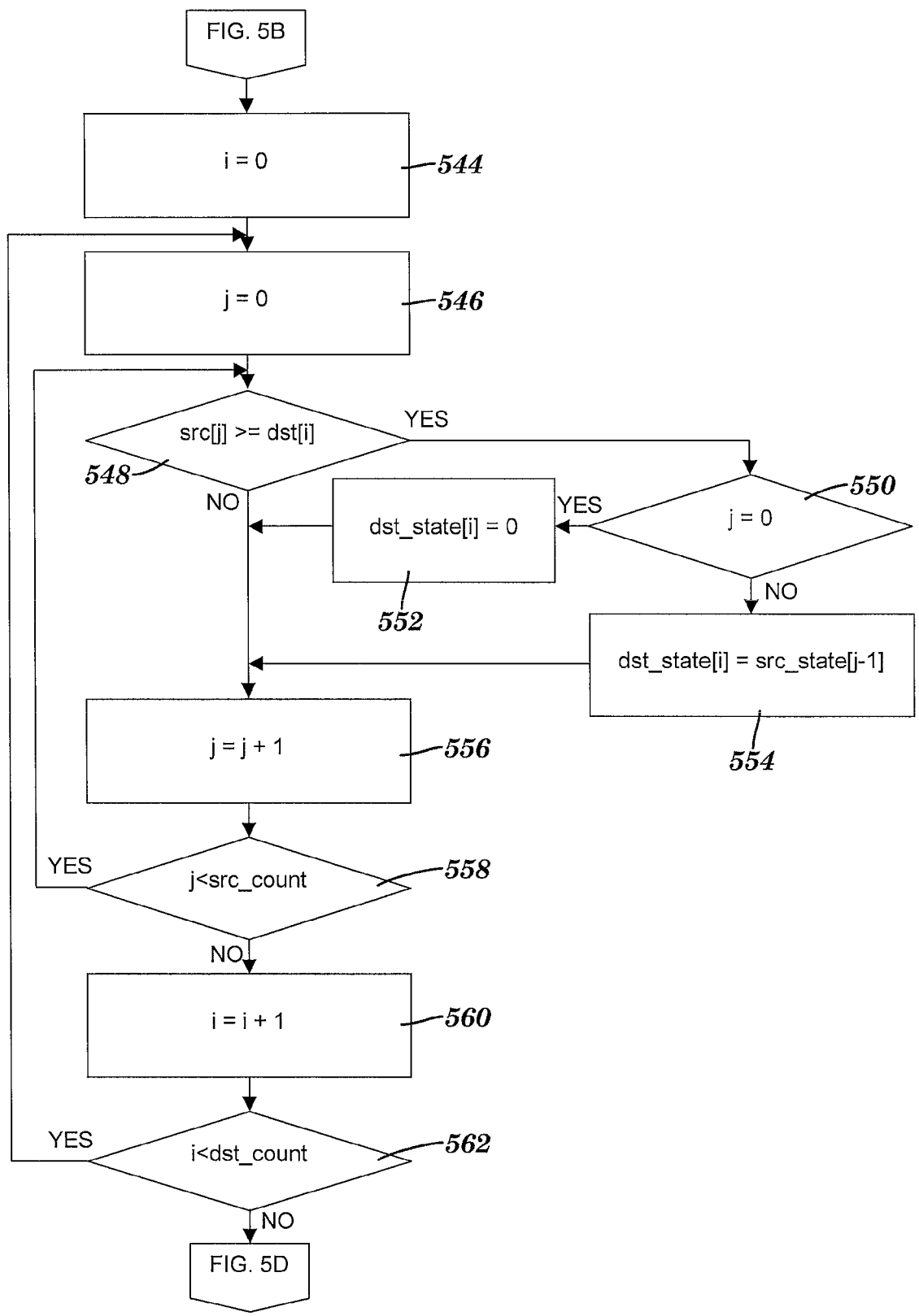
Figure 5D:
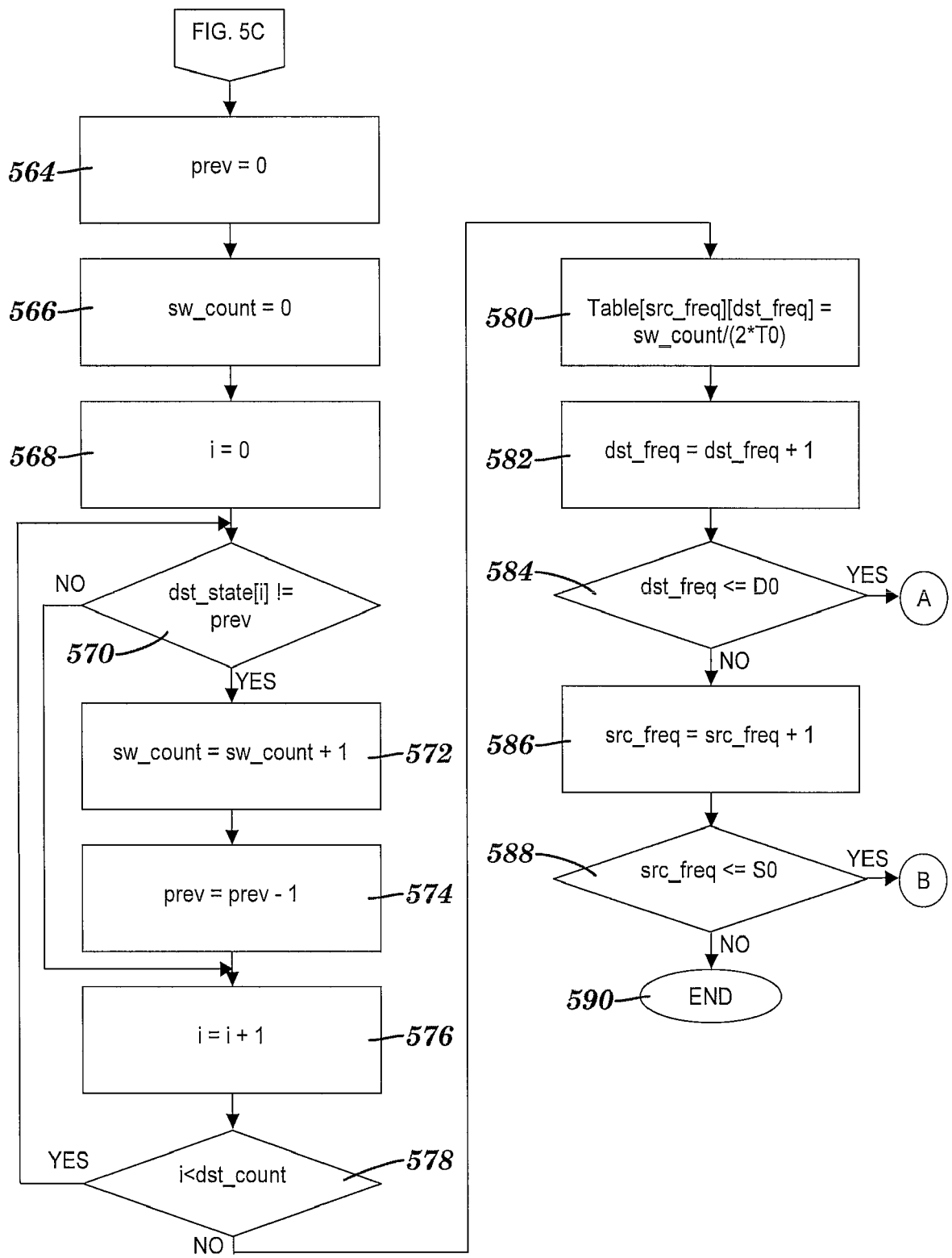

FIG. 2 is a flow diagram of a process of estimating screen refresh rates in the system of FIG. 1, in accordance with embodiments of the present invention. The screen refresh rate estimation process begins at step 200. In step 202, leader computing unit 104 (see FIG. 1) opens an Internet collaboration application (e.g., a web conference application) session with server 102 (see FIG. 1). Leader computing unit 104 (see FIG. 1) is, for example, a computer utilized by a leader of a web conference (i.e., a web conference leader computer). In step 204, leader computing unit 104 (see FIG. 1) shares an application which is local to and running on the leader computing unit 104. The leader computing unit's sharing of the application displays an image to one or more computing units (e.g., participant computing units 106-1, ..., 106-n of FIG. 1) participating in the Internet-based collaboration.

In a first embodiment, the image displayed in step 204 is an animated, full-screen rectangular test image in a graphics format. As used herein, a test image is an image that is displayed for testing purposes and does not convey information that is the subject of the Internet-based collaboration. As one example, the graphics format of the image is the Graphics Interchange Format (GIF). A plurality of test pixels flash (i.e., blink) on and off at pre-set flashing frequencies at pre-defined locations within the image. The pre-set flashing frequencies range, for example, from 1 to 25 Hz stepping up by 1 Hz. The pixels are divided into a plurality of groups, where each group has its own pre-set flashing frequency assigned. The remaining parts of the image are occupied by randomly generated pixels which frustrate any image compression algorithms in order to exclude such algorithms' interference.

This first embodiment is to be used by web conferencing software developers to (a) determine the best parameter values for communication, image compression and screen refreshing algorithms, and (b) compare different transport or application layer protocols being used.

In a second embodiment, the image displayed in step 204 includes a plurality of flashing test pixels as described above, but is not a full-screen test image. Instead, the flashing pixels are in a specified test area that is incorporated within a full-screen image that includes the content being transferred among web conference users. The test area is incorporated into the full-screen image so that the flashing pixels do not significantly affect the image being transferred. For example, the test area is a small rectangular area within the full-screen image. The second embodiment provides real-time automated feedback to the conference leader, so the leader is able to adjust the presentation parameters accordingly.

In step 206, each participant computing unit 1, ..., n (see FIG. 1) is running a filtering video driver (FVD) which, for each test pixel, measures the number of "blinks" (e.g., black-to-white transitions) in a specified period of time (e.g., 60 seconds). In step 208, for each participant computing unit, the blink measurement results are summed and averaged (e.g., summed and divided by the number of seconds in the specified period of time). For each participant computing unit, step 208 also stores the aforementioned sums and average in a measurement data table stored locally to that participant computing unit. A cell at the i-th row and j-th column of each measurement data table contains the number of blinks per second of a j-th test pixel at an i-th test frequency. An example of the table in step 208 is table 300 in FIG. 3. A specified row of the measurement data table includes the sum of the number of blinks per second over all the test frequencies for the i-th test pixel (e.g., the last row of table 300 in FIG. 3). Finally, step 208 calculates the average sum of the number of blinks per unit of time (e.g., per second) over all the test pixels and places the calculated average sum into a specified row and column of the measurement data table (e.g., into the last row and last column of table 300 of FIG. 3).

In step 210, each participant computing unit 1, ..., n (see FIG. 1) generates a table of simulation data that includes a calculated number of blinks per specified time period (e.g., per second) for a test pixel as a function of the test pixel blinking frequency and the conference participant computing unit's screen refresh frequency.

In step 212, each participant computing unit 1, ..., n (see FIG. 1) sums the values of the number of blinks per specified time period in the simulation data table over all test pixel blinking frequencies to generate a set of sums corresponding to the participant computing unit screen refresh frequencies.

In step 214, the average sum of the number of blinks per unit of time calculated in step 208 is compared against the set of sums generated in step 212 to identify the sum of the number of blinks in the simulation data table that is closest to the average sum calculated in step 208. This comparison in step 214 is performed by each participant computing unit 1, ..., n (see FIG. 1). An estimated screen refresh frequency of each participant computing unit is then determined as being the simulated data table's screen refresh frequency value that corresponds to the sum identified as being closest in step 214. The screen refresh rate estimation process ends at step 216.

An example of a portion of the simulation data table is table 400 in FIG. 4. Table 400 includes the calculated number of blinks per second of test pixels, as a function of the test pixel blinking frequency and the conference participant computer screen refresh frequency. Thus, a cell at the i-th row and j-th column of table 400 includes the number of blinks per second of a test pixel at a conference participant computer where the pixel's blinking frequency is defined in the i-th row of the first column of table 400, and the participant computing unit's screen refresh rate is defined in the j-th column of the first row of table 400. The last row of table 400 includes the sum of the number of blinks over all the test frequencies for a given conference participant computing unit's screen refresh rate (i.e., the sum over all the rows of table 400 for a given column, as computed in step 212 of FIG. 2). For example, the cell at the $12^{th}$ row of data and $23^{rd}$ column of data in table 400 indicates 11 blinks per second for a test pixel at a test pixel blinking frequency of 12 and a participant computing unit screen refresh frequency of 23.

As an example of the screen refresh rate estimation process relative to the tables in FIGS. 3 and 4, the average sum of the number of blinks over all test frequencies calculated in step 208 is 72 (i.e., the last row and last column of table 300 in FIG. 3). The step 214 comparison of 72 to the set of sums of the number of blinks over all the test frequencies in the last row of table 400 in FIG. 4 determines that 72 is closest to the value of 73 (i.e., in the twelfth column of data in table 400 of FIG. 4). Since that value of 73 corresponds to the value of 12 in the first row of table 400 of FIG. 4, 12 is the estimated screen refresh frequency of the participant computing unit.

Generating the Simulated Data Table

FIGS. 5A-5D depict a flow diagram of a process for generating a table of simulated blinks per second data, such as the table of FIG. 4, in accordance with embodiments of the present invention. The process of generating the table of simulated data begins at step 500 of FIG. 5A. In step 502, the memory variable src_freq containing the test pixel blinking frequency is initialized with the value of 1. In step 504, the memory variable dst_freq containing the screen refresh rate at the conference participant computing unit is initialized with the value of 1.

In step 506, the memory variable src_wl containing the time interval between test pixel state changes (i.e., blinks) is assigned the value of the inverse of the test pixel blinking rate divided by 2 (since there are two state changes for every blinking cycle: from black to white and from white to black).

In step 508, the memory variable dst_wl containing the time interval between two consecutive screen refreshes at the conference participant is assigned the value of the inverse of the screen refresh rate.

In step 510, the memory variable src_count containing the number of elements in the auxiliary array src_state is assigned the value of the test pixel blinking frequency multiplied by two to reflect the fact that there are two state transitions per blinking cycle, and further multiplied by the value of T0 (i.e., the parameter indicating the time interval of the simulation, (e.g., 60 seconds)).

In step 512, the memory variable dst_count containing the number of elements in the auxiliary array dst_state is assigned the value of the screen refresh rate multiplied by the value of T0.

In step 514, the elapsed time counter et is initialized with the value of 0. In step 516, the memory variable state that indicates the current state of the test pixel, is initialized with the value of 0. In step 518, the counter i of the elements of auxiliary arrays src[ ] and src_state[ ] is initialized with the value of 0.

In step 520, the i-th element of the auxiliary array src[ ] is initialized with the current value of the elapsed time et (e.g., the value of the timer et when the test pixel blinking with the current frequency changed its state).

In step 522, the i-th element of the auxiliary array src_state[ ] is initialized with the current value of the memory variable state, which contains the current state (i.e., black or white) of the blinking test pixel.

In step 524, the elapsed time counter et gets incremented by the value of the memory variable src_wl, which contains the time interval between test pixel state changes (i.e., blinks).

In step 526, the memory variable state, which contains the current state (i.e., black or white) of the blinking test pixel, changes its value to 1 if the value had been 0, and changes its value to 0 if the value had been 1 to simulate the test pixel blinking.

In step 528 the counter i is incremented by 1. If inquiry step 530 determines that the current value of the counter i is less than the value of the memory variable src_count, then the method of FIG. 5A repeats starting at step 520. Otherwise, the processing continues at step 532 of FIG. 5B.

In step 532, the elapsed time counter et is initialized with the value of 0. In step 534, the counter i of the elements of auxiliary array dst[ ] is initialized with the value of 0. In step 536, the i-th element of the auxiliary array dst[ ] is initialized with the current value of the elapsed time et (e.g., the value of the timer et when the conference participant computer screen is refreshed).

In step 538, the elapsed time counter et is incremented by the value of the memory variable dst_wl, which contains the time interval between two consecutive refreshes of the conference participant computer screen.

In step 540 the counter i is incremented by 1. If inquiry step 542 determines that the current value of the counter i is less than the value of the memory variable dst_count, then the method of FIG. 5B repeats starting at step 536. Otherwise, the processing continues at step 544 of FIG. 5C.

In step 544, the counter i of the elements of auxiliary array dst[ ] is initialized with the value of 0. In step 546, the counter j of the elements of auxiliary array src[ ] is initialized with the value of 0.

If inquiry step 548 determines that the value of the j-th element of the auxiliary array src is greater than or equal to the value of the i-th element of the auxiliary array dst, then the processing continues at step 550. That is, the process of FIGS. 5A-5D finds the dst[ ] array element nearest in time to the current src[ ] array element (i.e., the earliest moment in time after the test pixel state change when the conference participant screen has been refreshed). If inquiry step 548 determines that the value of the j-th element of the auxiliary array src is not greater than or equal to the value of the i-th element of the auxiliary array dst, then the next iteration of the current cycle is initiated at step 556.

If inquiry step 550 determines that the counter j is equal to 0 (i.e., there is no previous element in the src_state[ ] array), then the process of FIGS. 5A-5D branches to step 552, which assigns zero to the i-th element of a dst_state[ ] array; otherwise, the processing continues at step 554.

In step 554, the i-th element of the dst_state[ ] array, which includes the value of the test pixel state as observed at the conference participant computer at the moment of time stored in dst[i] element, is assigned the value of the (−1)-th element of the src_state[ ] array, which includes the test pixel state at the moment of time stored in src[j] (i.e., at the closest moment in time when the test pixel changed its state immediately before the conference participant computer screen had been refreshed, where the test pixel state is observed immediately after the screen refresh).

In step 556 the counter j is incremented by 1. If inquiry step 558 determines that the current value of the counter j is less than the value of the memory variable src_count, then the process of FIGS. 5A-5D loops back to step 548. Otherwise, the processing continues at step 560.

In step 560 the counter i is incremented by 1. If inquiry step 562 determines that the current value of the counter i is less than the value of the memory variable dst_count (i.e., determines that the specified simulation time interval has elapsed), then the process of FIGS. 5A-5D loops back to step 546. Otherwise, the processing continues at step 564 of FIG. 5D.

In step 564, the memory variable prev which contains the state of the test pixel at the moment immediately preceding the current moment, is initialized with the value of 0. In step 566, the counter sw_count of the test pixel state changes is initialized with the value of 0. In step 568, the counter i of the elements of auxiliary array dst[ ] is initialized with the value of 0.

If inquiry step 570 determines that the value of i-th element of the dst_state array is not equal to the value of the memory variable prev (i.e., determines that the test pixel changed its state immediately before the i-th screen refresh), then the processing continues at step 572. Otherwise, the next iteration of the current cycle is initiated at step 576.

In step 572, the counter sw_count of the test pixel state is incremented by 1. In step 574, the memory variable prev, which contains the state of the test pixel at the moment immediately preceding the current moment, changes its state to 1 if the state had been 0 and changes its state to 0 if the state had been 1 to simulate the test pixel blinking.

In step 576 the counter i is incremented by 1. If inquiry step 578 determines that the current value of the counter i is less than the value of the memory variable dst_count, then the process of FIGS. 5A-5D loops back to step 570. Otherwise, the processing continues at step 580.

In step 580, the current element of the resulting simulated data table is assigned the value of the counter sw_count divided by the number of seconds T0, and further divided by 2 to track the frequency and not the state changes.

In step 582, the counter dst_freq is incremented by 1. If inquiry step 584 determines that the value of dst_freq counter is less than or equal to the value of D0 (i.e., the parameter indicating the maximum screen refresh rate for the simulation), then the process of FIGS. 5A-5D loops back to step 506 (see FIG. 5A). Otherwise, the processing continues at step 586.

In step 586, the counter src_freq is incremented by 1. If inquiry step 588 determines that the value of the src_freq counter is less than or equal to the value of S0 (i.e., the parameter indicating the maximum test pixel blinking frequency for the simulation), then the process of FIGS. 5A-5D loops back to step 504 (see FIG. 5A). Otherwise, the processing terminates at step 590.

Computing System

Figure 6:
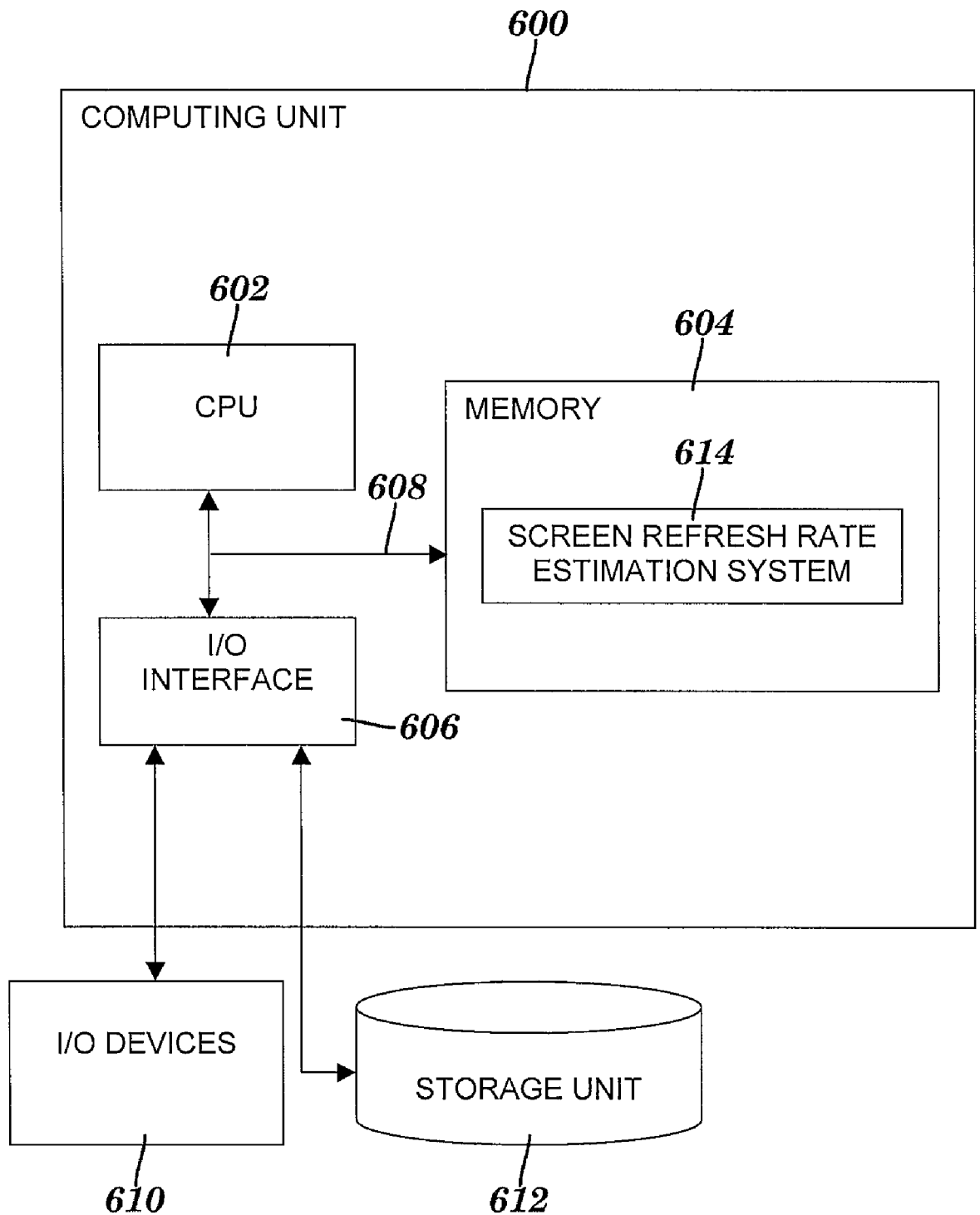
FIG. 6 is a block diagram of a computing system included in the system of FIG. 1, in accordance with embodiments of the present invention.

FIG. 6 is a block diagram of a computing system included in the system of FIG. 1 and that implements the process of FIG. 2, in accordance with embodiments of the present invention. Computing unit 600 generally comprises a central processing unit (CPU) 602, a memory 604, an input/output (I/O) interface 606, a bus 608, I/O devices 610 and a storage unit 612. CPU 602 performs computation and control functions of computing unit 600. CPU 602 may comprise a single processing unit, or be distributed across one or more processing units in one or more locations (e.g., on a client and server).

Memory 604 may comprise any known type of data storage and/or transmission media, including bulk storage, magnetic media, optical media, random access memory (RAM), read-only memory (ROM), a data cache, a data object, etc. Cache memory elements of memory 604 provide temporary storage of at least some program code in order to reduce the number of times code must be retrieved from bulk storage during execution. Moreover, similar to CPU 602, memory 604 may reside at a single physical location, comprising one or more types of data storage, or be distributed across a plurality of physical systems in various forms. Further, memory 604 can include data distributed across, for example, a LAN, WAN or storage area network (SAN) (not shown).

I/O interface 606 comprises any system for exchanging information to or from an external source. I/O devices 610 comprise any known type of external device, including a display monitor, keyboard, mouse, printer, speakers, hand-held device, printer, facsimile, etc. Bus 608 provides a communication link between each of the components in computing unit 600, and may comprise any type of transmission link, including electrical, optical, wireless, etc.

I/O interface 606 also allows computing unit 600 to store and retrieve information (e.g., program instructions or data) from an auxiliary storage device 612. The auxiliary storage device may be a non-volatile storage device such as a magnetic disk drive or an optical disk drive (e.g., a CD-ROM drive which receives a CD-ROM disk). Computing unit 600 can store and retrieve information from other auxiliary storage devices (not shown), which can include a direct access storage device (DASD) (e.g., hard disk or floppy diskette), a magneto-optical disk drive, a tape drive, or a wireless communication device.

Memory 604 includes a screen refresh rate estimation system 614, which implements steps in the process of FIG. 2. Further, memory 604 may include other systems not shown in FIG. 6, such as an operating system (e.g., Linux) that runs on CPU 602 and provides control of various components within and/or connected to computing unit 600.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code of screen refresh rate estimation system 614 for use by or in connection with a computing unit 600 or any instruction execution system to provide and facilitate the capabilities of the present invention. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, RAM 604, ROM, a rigid magnetic disk and an optical disk. Current examples of optical disks include compact disk-read-only memory (CD-ROM), compact disk-read/write (CD-R/W) and DVD.

Any of the components of the present invention can be deployed, managed, serviced, etc. by a service provider that offers to deploy or integrate computing infrastructure with respect to the screen refresh rate estimation process of the present invention. Thus, the present invention discloses a process for supporting computer infrastructure, comprising integrating, hosting, maintaining and deploying computer-readable code into a computing system (e.g., computing unit 600), wherein the code in combination with the computing system is capable of performing a method of estimating a screen refresh rate.

In another embodiment, the invention provides a business method that performs the process steps of the invention on a subscription, advertising and/or fee basis. That is, a service provider, such as a Solution Integrator, can offer to create, maintain, support, etc. a process of estimating a screen refresh rate of the present invention. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered a part of the present invention as recited in the appended claims.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of estimating a screen refresh rate of a computing unit participating in an Internet-based collaboration, comprising:

receiving, by said computing unit and during said Internet-based collaboration, a test image including a plurality of test pixels located at predefined positions in said test image, wherein a test pixel of said plurality of test pixels performs a blinking between an on state and an off state at a predefined frequency of a plurality of predefined frequencies;

collecting, by said computing unit, a plurality of measurements, wherein a measurement of said plurality of measurements is a number of blinks in said blinking in a specified time period;

calculating, by said computing unit, an average of a first plurality of sums of multiple sets of measurements of said plurality of measurements over said plurality of predefined frequencies;

automatically selecting a screen refresh rate of a plurality of screen refresh rates as an estimated screen refresh rate of said computing unit, said automatically selecting including comparing said average to a sum of a second plurality of sums of sets of numbers of simulated blinks of a simulated test pixel in said specified time period, said average being closer to said sum than any other sum of said second plurality of sums, and said sum of said second plurality of sums being associated with said screen refresh rate.

2. The method of claim 1, further comprising:

calculating said first plurality of sums, wherein a sum of said first plurality of sums is calculated by adding a set of measurements of said multiple sets of measurements, said set of measurements associated with said test pixel, and said adding performed over said plurality of predefined frequencies.

3. The method of claim 1, further comprising:

generating a table of simulation data, said simulation data including said sets of numbers of simulated blinks of a simulated test pixel, said sets of numbers of simulated blinks being associated with said plurality of screen refresh rates in a one-to-one correspondence, wherein an (i,j)-th cell of said table includes a number of simulated blinks as a function of an i-th predefined frequency of said plurality of predefined frequencies and a j-th screen refresh rate of said plurality of screen refresh rates.

4. The method of claim 3, wherein said generating said table comprises:

computing said number of simulated blinks included in said (i,j)-th cell of said table as sw_count/(2*T0), wherein said sw_count is a count of state changes of said simulated test pixel, and wherein said T0 is said specified time period.

5. The method of claim 1, wherein said receiving said test image comprises:

receiving said plurality of test pixels in a first portion of said test image;

receiving randomly generated pixels in remaining portions of said test image other than said first portion; and preventing, in response to said receiving said randomly generated pixels, an image compression algorithm executing on said computing unit from compressing a part of said test image that substantially equals said remaining portions of said test image.

6. The method of claim 1, wherein said receiving said test image comprises:

receiving said plurality of test pixels within an image that includes content being shared among a plurality of participants in said Internet-based collaboration, wherein said plurality of participants includes said computing unit.

7. The method of claim 1, wherein said collecting includes utilizing a filtering video driver executing on said computing unit to measure said number of blinks.

8. A system for estimating a screen refresh rate of a computing unit participating in an Internet-based collaboration, comprising:

means for receiving, by said computing unit and during said Internet-based collaboration, a test image including a plurality of test pixels located at predefined positions in said test image, wherein a test pixel of said plurality of test pixels performs a blinking between an on state and an off state at a predefined frequency of a plurality of predefined frequencies;

means for collecting, by said computing unit, a plurality of measurements, wherein a measurement of said plurality of measurements is a number of blinks in said blinking in a specified time period;

means for calculating, by said computing unit, an average of a first plurality of sums of multiple sets of measurements of said plurality of measurements over said plurality of predefined frequencies;

means for automatically selecting a screen refresh rate of a plurality of screen refresh rates as an estimated screen refresh rate of said computing unit, said means for automatically selecting including means for comparing said average to a sum of a second plurality of sums of sets of numbers of simulated blinks of a simulated test pixel in said specified time period, said average being closer to said sum than any other sum of said second plurality of sums, and said sum of said second plurality of sums being associated with said screen refresh rate.

9. The system of claim 8, further comprising:

means for calculating said first plurality of sums, wherein a sum of said first plurality of sums is calculated by adding a set of measurements of said multiple sets of measurements, said set of measurements associated with said test pixel, and said adding performed over said plurality of predefined frequencies.

10. The system of claim 8, further comprising:

means for generating a table of simulation data, said simulation data including said sets of numbers of simulated blinks of a simulated test pixel, said sets of numbers of simulated blinks being associated with said plurality of screen refresh rates in a one-to-one correspondence, wherein an (i,j)-th cell of said table includes a number of simulated blinks as a function of an i-th predefined frequency of said plurality of predefined frequencies and a j-th screen refresh rate of said plurality of screen refresh rates.

11. The system of claim 10, wherein said means for generating said table comprises:

means for computing said number of simulated blinks included in said (i,j)-th cell of said table as sw_count/(2*T0), wherein said sw_count is a count of state changes of said simulated test pixel, and wherein said T0 is said specified time period.

12. The system of claim 8, wherein said means for receiving said test image comprises:
  means for receiving said plurality of test pixels in a first portion of said test image;
  means for receiving randomly generated pixels in remaining portions of said test image other than said first portion; and
  means for preventing, in response to said receiving said randomly generated pixels, an image compression algorithm executing on said computing unit from compressing a part of said test image that substantially equals said remaining portions of said test image.

13. The system of claim 8, wherein said means for receiving said test image comprises:
  means for receiving said plurality of test pixels within an image that includes content being shared among a plurality of participants in said Internet-based collaboration, wherein said plurality of participants includes said computing unit.

14. The system of claim 8, wherein said means for collecting includes means for utilizing a filtering video driver executing on said computing unit to measure said number of blinks.

15. A computer program product comprising a computer-readable storage medium including computer-readable program code stored therein for estimating a screen refresh rate of a computing unit participating in an Internet-based collaboration, comprising:
  computer-readable code for receiving, by said computing unit and during said Internet-based collaboration, a test image including a plurality of test pixels located at predefined positions in said test image, wherein a test pixel of said plurality of test pixels performs a blinking between an on state and an off state at a predefined frequency of a plurality of predefined frequencies;
  computer-readable code for collecting, by said computing unit, a plurality of measurements, wherein a measurement of said plurality of measurements is a number of blinks in said blinking in a specified time period;
  computer-readable code for calculating, by said computing unit, an average of a first plurality of sums of multiple sets of measurements of said plurality of measurements over said plurality of predefined frequencies;
  computer-readable code for automatically selecting a screen refresh rate of a plurality of screen refresh rates as an estimated screen refresh rate of said computing unit, said computer-readable code for automatically selecting including computer-readable code for comparing said average to a sum of a second plurality of sums of sets of numbers of simulated blinks of a simulated test pixel in said specified time period, said average being closer to said sum than any other sum of said second plurality of sums, and said sum of said second plurality of sums being associated with said screen refresh rate.

16. The program product of claim 15, further comprising:
  computer-readable code for calculating said first plurality of sums, wherein a sum of said first plurality of sums is calculated by adding a set of measurements of said multiple sets of measurements, said set of measurements associated with said test pixel, and said adding performed over said plurality of predefined frequencies.

17. The program product of claim 15, further comprising:
  computer-readable code for generating a table of simulation data, said simulation data including said sets of numbers of simulated blinks of a simulated test pixel, said sets of numbers of simulated blinks being associated with said plurality of screen refresh rates in a one-to-one correspondence, wherein an (i,j)-th cell of said table includes a number of simulated blinks as a function of an i-th predefined frequency of said plurality of predefined frequencies and a j-th screen refresh rate of said plurality of screen refresh rates.

18. The program product of claim 17, wherein said computer-readable code for generating said table comprises:
  computer-readable code for computing said number of simulated blinks included in said (i,j)-th cell of said table as sw_count/(2*T0), wherein said sw_count is a count of state changes of said simulated test pixel, and wherein said T0 is said specified time period.

19. The program product of claim 15, wherein said computer-readable code for receiving said test image comprises:
  computer-readable code for receiving said plurality of test pixels in a first portion of said test image;
  computer-readable code for receiving randomly generated pixels in remaining portions of said test image other than said first portion; and
  computer-readable code for preventing, in response to said receiving said randomly generated pixels, an image compression algorithm executing on said computing unit from compressing a part of said test image that substantially equals said remaining portions of said test image.

20. The program product of claim 15, wherein said computer-readable code for receiving said test image comprises:
  computer-readable code for receiving said plurality of test pixels within an image that includes content being shared among a plurality of participants in said Internet-based collaboration, wherein said plurality of participants includes said computing unit.

21. The program product of claim 15, wherein said computer-readable code for collecting includes computer-readable code for utilizing a filtering video driver executing on said computing unit to measure said number of blinks.

22. A process for supporting computing infrastructure, said process comprising providing at least one support service for at least one of creating, integrating, hosting, maintaining, and deploying computer-readable code in a computing system, wherein the code in combination with the computing system is capable of performing a method of estimating a screen refresh rate of a computing unit participating in an Internet-based collaboration, comprising:
  receiving, by said computing unit and during said Internet-based collaboration, a test image including a plurality of test pixels located at predefined positions in said test image, wherein a test pixel of said plurality of test pixels performs a blinking between an on state and an off state at a predefined frequency of a plurality of predefined frequencies;
  collecting, by said computing unit, a plurality of measurements, wherein a measurement of said plurality of measurements is a number of blinks in said blinking in a specified time period;
  calculating, by said computing unit, an average of a first plurality of sums of multiple sets of measurements of said plurality of measurements over said plurality of predefined frequencies;
  automatically selecting a screen refresh rate of a plurality of screen refresh rates as an estimated screen refresh rate of said computing unit, said automatically selecting including comparing said average to a sum of a second plurality of sums of sets of numbers of simulated blinks of a simulated test pixel in said specified time period, said average being closer to said sum than any other sum of said second plurality of sums, and said sum of said second plurality of sums being associated with said screen refresh rate.

23. The process of claim 22, wherein said method further comprises:
    calculating said first plurality of sums, wherein a sum of said first plurality of sums is calculated by adding a set of measurements of said multiple sets of measurements, said set of measurements associated with said test pixel, and said adding performed over said plurality of predefined frequencies.

24. The process of claim 22, wherein said method further comprises:
    generating a table of simulation data, said simulation data including said sets of numbers of simulated blinks of a simulated test pixel, said sets of numbers of simulated blinks being associated with said plurality of screen refresh rates in a one-to-one correspondence, wherein an (i,j)-th cell of said table includes a number of simulated blinks as a function of an i-th predefined frequency of said plurality of predefined frequencies and a j-th screen refresh rate of said plurality of screen refresh rates.

25. The process of claim 24, wherein said generating said table comprises:
    computing said number of simulated blinks included in said (i,j)-th cell of said table as sw_count/(2*T0), wherein said sw_count is a count of state changes of said simulated test pixel, and wherein said T0 is said specified time period.

26. The process of claim 22, wherein said receiving said test image comprises:
    receiving said plurality of test pixels in a first portion of said test image;
    receiving randomly generated pixels in remaining portions of said test image other than said first portion; and
    preventing, in response to said receiving said randomly generated pixels, an image compression algorithm executing on said computing unit from compressing a part of said test image that substantially equals said remaining portions of said test image.

27. The process of claim 22, wherein said receiving said test image comprises:
    receiving said plurality of test pixels within an image that includes content being shared among a plurality of participants in said Internet-based collaboration, wherein said plurality of participants includes said computing unit.

28. The process of claim 22, wherein said collecting includes utilizing a filtering video driver executing on said computing unit to measure said number of blinks.

* * * * *